US010879698B2

(12) United States Patent
Carr et al.

(10) Patent No.: US 10,879,698 B2
(45) Date of Patent: Dec. 29, 2020

(54) SYSTEMS AND METHODS FOR PERFORMING BUILDING POWER MANAGEMENT

(71) Applicant: ABB Schweiz AG, Baden (CH)

(72) Inventors: Joseph A. Carr, Raleigh, NC (US); Alexander Brissette, Raleigh, NC (US)

(73) Assignee: ABB Schweiz AG, Baden (CH)

(*) Notice: Subject to any disclaimer, the term of this patent is extended or adjusted under 35 U.S.C. 154(b) by 340 days.

(21) Appl. No.: 15/827,314

(22) Filed: Nov. 30, 2017

(65) Prior Publication Data

US 2019/0165578 A1    May 30, 2019

(51) Int. Cl.
H02J 3/14       (2006.01)
G06Q 50/06     (2012.01)
G05B 19/042   (2006.01)
G06Q 50/16     (2012.01)
H02J 13/00     (2006.01)

(52) U.S. Cl.
CPC ............. H02J 3/14 (2013.01); G05B 19/042 (2013.01); G06Q 50/06 (2013.01); G06Q 50/16 (2013.01); H02J 13/0079 (2013.01)

(58) Field of Classification Search
CPC ........ H02J 3/14; H02J 13/0079; G06Q 50/16; G06Q 50/06; G05B 19/042; G05B 15/02
See application file for complete search history.

(56) References Cited

U.S. PATENT DOCUMENTS

| | | | | |
|---|---|---|---|---|
| 7,860,615 B2* | 12/2010 | Nelson | ............... | H02H 7/28 700/286 |
| 8,670,875 B2* | 3/2014 | Lo | ............... | G05B 15/02 700/296 |
| 8,671,167 B2* | 3/2014 | Koch | ............... | G06F 9/5083 709/220 |
| 9,124,132 B2 | 9/2015 | Songkakul et al. | | |
| 9,183,522 B2* | 11/2015 | Koch | ............... | G06F 16/90332 |

(Continued)

OTHER PUBLICATIONS

International Search Report and Written Opinion, PCT Appln. No. PCT/US18/63279, dated Feb. 26, 2019, 11 pgs.

(Continued)

Primary Examiner — Jared Fureman
Assistant Examiner — Michael J Warmflash
(74) Attorney, Agent, or Firm — Taft Stettinius & Hollister LLP; J. Bruce Schelkopf

(57) ABSTRACT

A method for performing building power management includes interfacing a power manager with an upstream controller to obtain a demand response event signal; receiving and parsing the demand response event signal; determining a power target based on a payload, and demand response begin and end times specified in the demand response event signal; evaluating whether an average power exceeds or falls below a limit; determining whether a shed action or a restore action is required; determining which variable and fixed electrical loads are to be maintained, shed or restored; interfacing the power manager with a building automation system (BAS); providing the BAS with a load control signal instructing that selected variable and fixed electrical loads are to be shed or restored; and selectively maintaining, shedding or restoring the selected variable and fixed electrical loads responsive to the load control signal.

22 Claims, 4 Drawing Sheets

(56) References Cited

U.S. PATENT DOCUMENTS

| | | | | |
|---|---|---|---|---|
| 9,310,786 | B2* | 4/2016 | Imhof | H02J 3/00 |
| 9,563,215 | B2* | 2/2017 | Forbes, Jr. | G05F 1/66 |
| 2007/0005193 | A1* | 1/2007 | Nelson | H02J 13/00017 |
| | | | | 700/286 |
| 2014/0018969 | A1* | 1/2014 | Forbes, Jr. | G05B 15/02 |
| | | | | 700/295 |
| 2016/0116513 | A1* | 4/2016 | Dutta | G01R 22/10 |
| | | | | 700/295 |
| 2016/0162822 | A1 | 6/2016 | Nawy et al. | |
| 2016/0204607 | A1* | 7/2016 | Rogers, Jr. | H05B 47/11 |
| | | | | 315/151 |

OTHER PUBLICATIONS

Science Direct, Published by Elsevier Ltd., Tao Cui et al., "Connecting the Last Mile: Demand Response in Smart Buildings," 1876-6102 2017 (10 pages).

ABB SACE, New SACE EMAX 2, ABB, 2013 product brochure (16 pages).

OpenADR Alliance Open ADR 2.0 Profile Specification B Profile, Revision No. 1, Document No. 20120912-1, pp. 17, 18, 23, 24 and 29, Jul. 1, 2013 (106 pages).

The International Bureau of WIPO, International Preliminary Report on Patentability issued in corresponding international application No. PCT/US2018/063279, dated Jun. 2, 2020, 10 pp.

* cited by examiner

| Priority | Action | Taken? |
|---|---|---|
| 1 | Shed Priority Load | N |
| 2 | Shed Load 1 | N |
| 3 | Shed Load 2 | N |
| 4 | Shed Load 3 | Y |
| 5 | Shed Optional Load | Y |

| Priority | Action | Taken? |
|---|---|---|
| 1 | Shed Priority Load | N |
| 2 | Shed CB Controlled Load 1 | N |
| 3 | Shed CB Controlled Load 2 | N |
| 4 | Increase Temperature in Working Area to 26 °C | N |
| 5 | Dim Lights to 60% | N |
| 6 | Shed CB Controlled Load 3 | N |
| 7 | Increase Temperature of Break Area to 30 °C | N |
| 8 | Shed CB Controlled Optional Load | Y |
| 9 | Dim Lights to 80% | Y |

SYSTEMS AND METHODS FOR PERFORMING BUILDING POWER MANAGEMENT

TECHNICAL FIELD

The present application generally relates to power management and more particularly, but not exclusively, to systems and methods for performing building power management.

BACKGROUND

Building power management systems and methods remain an area of interest. Some existing systems have various shortcomings, drawbacks and disadvantages relative to certain applications. For example, in some systems and methods, the ability to control variable electrical loads in addition to fixed electrical loads is lacking. Accordingly, there remains a need for further contributions in this area of technology.

SUMMARY

One embodiment of the present invention is a unique method for performing building power management. Another embodiment is a unique system for performing building power management. Other embodiments include apparatuses, systems, devices, hardware, methods, and combinations for building power management. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
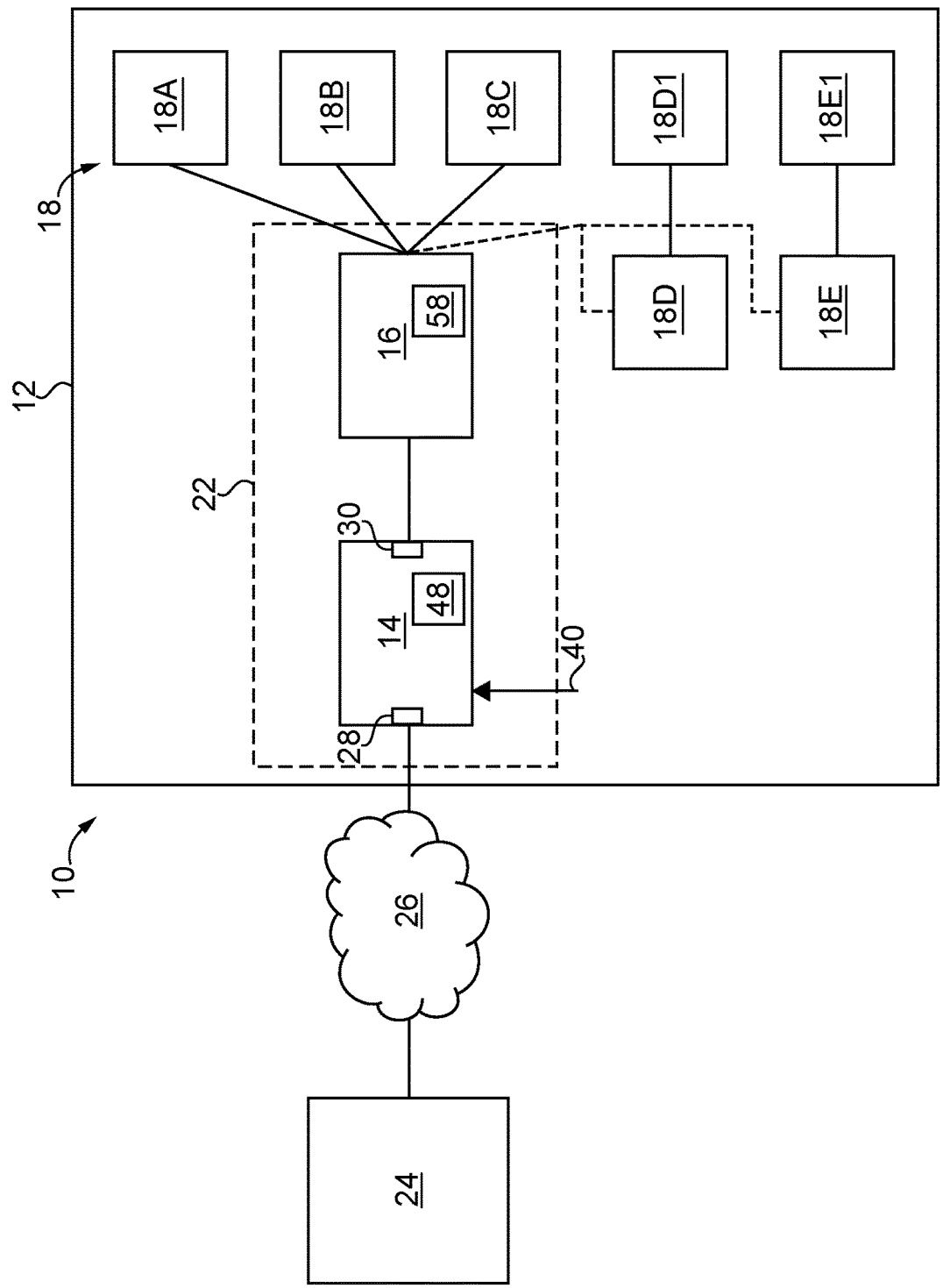
FIG. 1 schematically illustrates some aspects of a non-limiting example of a system for performing power management for a building in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a system 10 for performing power management for a building 12 in accordance with an embodiment of the present invention are schematically illustrated. In some embodiments, system 10 may be constructed for performing power management for a plurality of buildings 12 and/or other facilities. System 10 includes power manager 14 and a building automation system (BAS) 16 for managing electrical power consumption by a plurality of variable and fixed electrical loads 18. By "variable electrical loads," it is meant that the particular electrical loads have setpoints which may be changed in order to vary or control the power consumption of the variable electrical loads, e.g., thermostat controlled loads, dimmable lighting loads, to name a few examples. By "fixed electrical loads," it is meant that the particular loads are either turned on or turned off, but not varied, in order to control power consumption of the fixed electrical loads.

Power manager 14 is communicatively coupled to BAS 16, e.g., via a BAS interface. In one form, variable electrical loads 18 include at least one thermostatically controlled heating, ventilation, air conditioning and/or refrigeration loads 18A, dimmable lighting loads 18B and at least one thermostatically controlled water heater 18C. In other embodiments, other quantities and types of variable electrical loads may be used in addition to or in place of variable loads 18A, 18B and 18C. The fixed electrical loads are coupled to circuit breakers, e.g., circuit breakers 18D and 18E for turning on and off the fixed electrical loads. The fixed electrical loads may include, for example, appliances, such as coffee makers 18D1 and fixed lighting 18E1. In other embodiments, other quantities of circuit breakers and/or types of fixed electrical loads may be used in addition to or in place of circuit breakers 18D and 18E with appliances and fixed lighting 18D1 and 18E1. In one form, variable electrical loads 18A, 18B and 18C are communicatively coupled to BAS 16 and are controlled by BAS 16, and fixed electrical load circuit breakers 18D and 18E are communicatively coupled to power manager 14 and controlled directly by power manager 14, i.e., bypassing BAS 16 for the fixed electrical loads. In other embodiments, fixed electrical load circuit breakers 18D and 18E and/or other fixed electrical loads may alternatively be communicatively coupled to BAS 16 and controlled by BAS 16 in response to a control signal sent from power manager 14 to BAS 16, e.g., as indicated by dashed lines in FIG. 1.

In some embodiments, power manager 14 and BAS 16 are in the form of apps (software applications) that operate on a BAS server 22. In other embodiments, power manager 14 and BAS 16 may be separate firmware/hardware devices, or may be apps that operate on different controller or server platforms. For example, in some embodiments, BAS 16 may be an app operating on BAS server 22, whereas power manager 14 may be a separate hardware platform communicatively coupled to BAS 16. Power manager 14 is communicatively coupled to an upstream controller 24 via a communication link, e.g., the Internet 26. Upstream controller 24 may be, for example, a demand response automation controller (DRAC), referred to hereinafter as DRAC 24. DRAC 24 may be located at and/or associated with, for example, a power utility or an aggregator. Power manager 14 is communicatively coupled to DRAC 24 via a DRAC interface, discussed below. DRAC 24 is operative to transmit demand response event signals via the Internet that indicate the occurrence, and in some cases, the duration of a demand response event. The demand response event signal may include a payload, and a begin time and an end time for the demand response event. The payload may be a desired power consumption level, e.g., a target power, for the building or a power or energy price for one or more certain power consumption levels, or a numerical or other code that represents a desired target power or energy price, e.g., pre-agreed values based on a contract between the building 12 owner and the utility or aggregator.

In some embodiments, power manager 14 is used for building 12 power/energy management. In some embodiments, power manager 14 uses a power target to manage power, i.e., power consumption by building(s) (and/or other facilities), shedding loads when the average power (i.e., average power consumption by building(s) 12 and/or other facilities) over a predetermined time period, e.g., a time window, exceeds the target, restoring loads when the average power falls below the target and maintaining loads when the average power falls within the tolerance bandwidth. In one form, a load is maintained by providing a command to the load that does not shed or restore the load. In other embodiments, a load is maintained by not sending a shed or restore command to the load. The order of load shedding and restoration is determined by an action priority list accessed by power manager 14. Power manager 14 has or includes or has associated therewith a demand response interface (discussed below) that receives demand response event signals from DRAC 24, e.g., including a payload in the form of a demand response event or energy price, and then changes the power target (i.e., the power consumption target) for building 12 based on this signal.

Power manager 14 also provides an interface with BAS 16, i.e., a BAS interface, discussed below, so that the load power consumption can be modified by BAS 16 by changing the load control setpoints for variable electrical loads, keeping the load online at some partial capacity level, and in some embodiments by turning fixed electrical loads on or off, e.g., by turning circuit breakers on and off. In other embodiments, fixed loads themselves may be turned on or off directly by BAS 16, without turning on or off circuit breakers coupled to those loads. In other embodiments, fixed loads, e.g., circuit breakers for the fixed loads, are turned off by power manager 14 in place of BAS 16. These capabilities of power manager 14 allow participation in more load management programs than conventional energy/power management schemes, and reduce the disruption to the building occupants while energy management is being performed.

In one form, power manager 14 includes an interface 28, e.g., an upstream controller or a DRAC interface, for automatic demand response (ADR) interfacing with upstream controller or DRAC 24. DRAC interface 28 is communicatively coupled to DRAC 24, e.g., via a network communication link, including, for example, Internet 26, for receiving demand response event signals from DRAC 24. Interface 28 is one embodiment of the of the aforementioned demand response interface. In other embodiments, interface 28 may be separate from power manager 14 and accessible by power manager 14. In one form, DRAC interface 28 is operative to receive demand response event signals from DRAC 24 for power manager 14. Power manager 14 also includes an interface 30 for BAS 16, e.g., a BAS interface, for communicating and interfacing with BAS 16. BAS interface 30 is communicatively coupled to BAS 16. The communication link may be a software, firmware or hardware link within BAS server 22 or a wired, wireless, optical or any suitable communication link between power manager 14 in the form of a separate controller and BAS 16 or BAS server 22. In some embodiments, interface 30 may be separate from power manager 14 and accessible by power manager 14.

Power manager 14 is operative to direct the consumption of power by variable and fixed electrical loads 18 to achieve a power target, e.g., an example power target 34, within an established tolerance bandwidth 36 disposed about the power target, e.g., illustrated in FIG. 2, i.e., having an upper limit disposed above power target 34 and a lower limit disposed below power target 34. The power consumption of the variable and fixed electrical loads is determined in the form of an average power over a predetermined period of time 38, e.g., within a time window. Power manager 14 is communicatively coupled to a power signal input that provides a measured power 40 to power manager 14, i.e., the power delivered to or consumed by the building(s) 12 and/or other facilities that are under the aegis of power manager 14 and BAS 16.

Power manager 14 takes the average of the measured power 40 (FIG. 1), i.e., measured power consumption, over the predetermined period of time 38. In some embodiments, multiple averages may also be taken over smaller predetermined periods of time within the time window, e.g., at times $T_1$, $T_2$ and $T_3$ in FIG. 2, e.g., the average of the measured power 40, using the measured power 40 from the beginning of the time window to the current time, and assuming that the power remains at its current average value from the current time to the end of the time window. Power manager 14 evaluates whether the average power consumption over the predetermined period of time 38 falls within, exceeds or falls below power target tolerance bandwidth 36. If this average, e.g., $P_{AVG.T1}$, exceeds the power target 34 (exceeds the upper limit of limit of tolerance bandwidth 36 disposed about power target 34), for example, as illustrated at time $T_1$, power manager 14 takes a shed action, i.e., causes one or more loads to be shed. The shedding of loads is illustrated by the vertical portion 42 of the measured power curve 44. If the average power, e.g., $P_{AVG.T2}$, is lower than the power target (is lower than the lower limit of tolerance bandwidth 36), e.g., as illustrated at time $T_2$, for example, because loads have fallen below the power target (tolerance bandwidth) or because the power target has increased, then power manager 14 takes a restore action, i.e., causes one or more loads to be restored. The restoration of loads is indicated by the vertical portion 46 of measured power curve 44. If the average power, e.g., $P_{AVG.T3}$, falls within tolerance bandwidth 36 of the power target, as seen at time $T_3$, then power manager 14 takes no shed or restore action, i.e., does not restore or shed any of variable and fixed electrical loads 18, but instead maintains the loads, i.e., keeps the loads turned on or keeps the loads at their current power consumption level, depending on whether the loads are fixed loads or variable loads, respectively. Thus, loads are maintained, shed or restored, based on evaluating whether the average power falls within, exceeds or falls below the power target tolerance bandwidth.

Figures 2, 3:
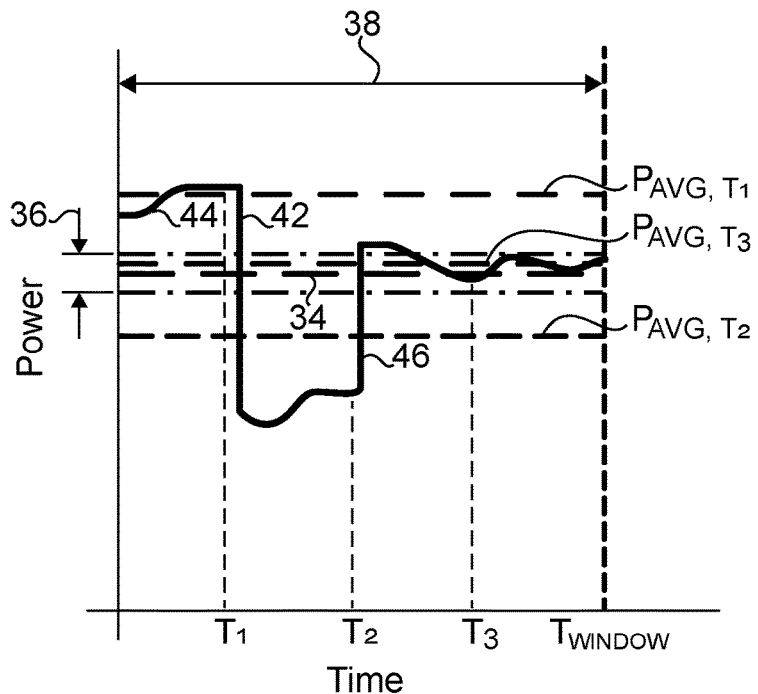
FIG. 2 schematically illustrates some aspects of a non-limiting example of a power averaging scheme for achieving a target power level in accordance with an embodiment of the present invention.
FIG. 3 illustrates some aspects of a non-limiting example of an action priority list in accordance with an embodiment of the present invention.

Power manager 14 is constructed to access or has an action priority list 48 (FIG. 1) of the possible load shedding (and load restoring, when the power target is above the current power consumption level) actions that can be taken, an example 48A of which is illustrated in FIG. 3. During operation, one or more loads are selected from action priority list 48 for shedding or restoring, or in the absence of a shed action or a restore action, for being maintained. Action priority list 48 may be stored in or with power manager 14 or BAS 16 or BAS server 22, or otherwise in a memory accessible to power manager 14. Power manager 14 is operative to access one or more action priority lists 48 during operation. The right-most column, "Priority" is the priority assigned to load or set of loads. The middle column, "Action," specifies the loads for which the priority has been assigned. The right-most column, "Taken?," indicates whether the action for a given load or set of loads has been taken, e.g., whether or not the given load or set of loads has been shed. A value of "N" indicates that the given load or set of loads has not been shed, or if previously shed, has been restored. A value of "Y" indicates that the given load or set of loads has been shed and not subsequently restored, i.e., is currently shed. It will be understood that the loads in the action priority list may be variable loads or fixed loads. In various embodiments, each line item of action priority list 48A is variously described as a different "load" and/or a different setpoint of a plurality of setpoints for the same load (e.g., regarding the latter, see action priority list 48B in FIG. 6). That is, in some embodiments of the present invention, the action priority list may include a plurality of line items, wherein some line items correspond to different loads, and wherein some line items correspond to different setpoints for one or more of the same loads. For example, one line item may represent a first load; another line item may represent a second load; a third line item might represent a first setpoint for a third load; and a fourth line item might represent a second setpoint for the third load. Each line item has a different priority in the action priority list. As an example of different setpoints for the same load, one line item may have as an action dimming a particular light or group of lights to 80% output, whereas another line item may have as an action dimming the same light or group of lights to 60% output. Thus, line items may pertain to different loads or may pertain to setpoints for one or more of the same loads; and the same load may be acted upon a plurality of times by power manager 14 and BAS 16. Each load and/or setpoint is assigned a priority in the action priority list. The maintaining, shedding or restoring of loads and/or setpoints is performed based on the priority.

A user, such as a building 12 manager or building 12 engineer specifies the list of actions and corresponding load(s) according to a priority selected by the user. When a load must be shed, the power manager 14 considers the possible actions starting from the lowest priority actions at the bottom of the list. It looks for the lowest priority load that has not been shed and then causes it to be shed. If the analysis of average power vs. power target indicates that load shedding is required, in the example of FIG. 3, the procedure would result in Load 2 being shed, given that the lowest two line items, i.e., the Optional Load and Load 3, have already been shed. Alternatively, if the analysis of average power vs. power target indicates that power consumption may be increased, e.g., because the power target tolerance bandwidth is higher than the average power consumption, loads may be restored.

When a load is to be restored, power manager 14 considers the possible actions starting from the highest priority actions at the top of the list. It looks for the highest priority load that has been shed, and then causes that load to be restored. The process is repeated until the average power level is within the power target tolerance bandwidth of the power target. If the same list were used, for example, and the average power was below the power tolerance bandwidth the power target, the procedure would result in Load 3 being restored, because higher line items—the priority Load, Load 1, and Load 2—are not currently shed, and moving down the action priority list, Load 3 is the highest priority load that had been shed prior to the restore action.

In one aspect, the power target can be changed in real time, based on the demand response event signal received by power manager 14 from DRAC 24. In another aspect, loads can be shed and restored by power manager 14 sending load control signals to BAS 16, in some embodiments, in addition to or in place of sending load control signals directly from power manager 14 to circuit breakers, such as circuit breakers 18D and 18E. For example, BAS 16 is communicatively coupled to variable electrical loads 18A, 18B and 18C, and operative to send load control signals to variable electrical loads 18A, 18B and 18C, which are based on load control signals sent to BAS 16 from power manager 14, e.g., via BAS interface 30. Power manager 14 is communicatively coupled to circuit breakers 18D and 18E and operative to send load control signals to circuit breakers 18D and 18E to turn on and turn off fixed electrical loads 18D1 and 18E1, respectively. In some embodiments, BAS 16 may alternatively be communicatively coupled to circuit breakers 18D and 18E (as indicated by dashed lines in FIG. 1), and operative to send load control signals to circuit breakers 18D and 18E to turn on and turn off fixed electrical loads 18D1 and 18E1, respectively, wherein the load control signals are based on load control signals sent to BAS 16 from power manager 14 via BAS interface 30.

In some embodiments, power manager 14 is operative to send the load control signals responsive to receiving a demand response event signal from DRAC 24, e.g., without human intervention. The communication structure for the ADR interface, e.g., interface 30, may be that specified by the OpenADR standard or another suitable communication structure or protocol.

The OpenADR standard specifies that a Virtual End Node (VEN) sends and receives XML files over standard internet protocols like HTTPS. These files are exchanged with a Virtual Top Node (VTN), which is an entity that exists at the utility or an aggregator and contains information such as whether an event is occurring at the present time and which VENs the event applies to. In some embodiments, power manager 14 may function as a VEN, and DRAC 24 may function as a VTN. There are a plurality of options for how the communication, e.g., from DRAC 24 to power manager 14, is triggered. In one form, interface 28 functions as a VEN interface used by power manager 14, and polls DRAC 24, (e.g., functioning as a VTN) at regular intervals to see if new information is available. In such embodiments, then, power manager 14 downloads a demand response event signal in the form of a file, e.g., an Extensible Markup Language (XML) file from DRAC containing the relevant information, e.g., as specified by the OpenADR protocol. In other embodiments, other types of demand response event signals may be employed, e.g., a stream of bits, an email, a spreadsheet, such as an Excel spreadsheet or any machine readable file. This demand response event signal may contain information indicating the time over which the event is occurring, e.g., a begin time and an end time. The demand response event signal may include a payload, such as a power level threshold or power target, an energy or power consumption level price, or a number indicating a pre-agreed event, such as price or power level. In some embodiments, the payload may be or include a signal between 0 and 3 indicating the severity of the event that is occurring, a price value for energy over the specified time period, a peak demand charge value over the specified time period, and/or in some cases, a specific energy target for the specified time period. Examples of some allowable signal types are specified in the OpenADR standard. Once this demand response event signal is received, it is parsed, e.g., using an XML reader, and the relevant information is stored, e.g., in a local memory associated with or accessible by power manager 14.

Figure 4C:
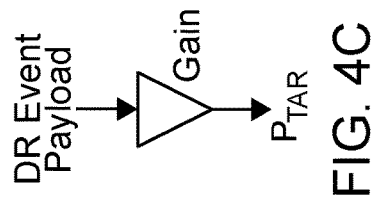
FIGS. 4A-4C schematically illustrate some aspects of non-limiting examples of different processes by which a power manager may determine a power target based on a received demand response event signal in accordance with some embodiments of the present invention.
Figure 4B:
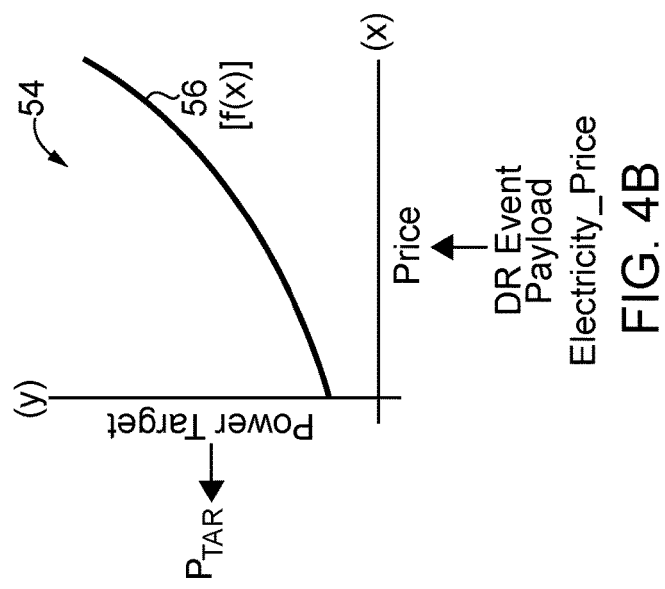
Figure 4A:
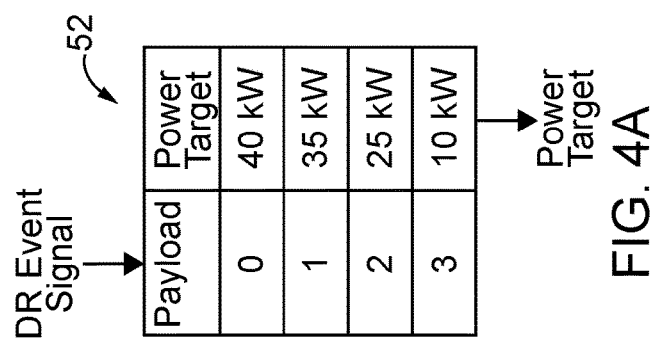

Referring to FIGS. 4A-4C some aspects of non-limiting examples of three different processes by which power manager 14 may determine the power target, e.g., power target 34, based on a demand response event signal received by power manager 14 from DRAC 24, are schematically illustrated. In some embodiments, the demand response event signal may be, for example, an EiEvent of the type associated with the OpenADR standard, and is referenced herein as an example of the type of signals that might be received by the power manager 14 from DRAC 24. In other embodiments, demand response event signals may take one or more of various other forms. Other standards or communication protocols may be used in other embodiments.

The scheme of FIG. 4A employs a look-up table 52 which associates possible values of the demand response event signal (DR Event Signal) payload with user-selected power target values. This is used for demand response event signals that consist of discrete values, such as signals of OpenADR the Simple type, Load_Dispatch type with level subtype, or Load_Control type with the x-LoadControlLevel-Offset subtype. The user, e.g., building manager or building engineer, populates the table 52 with, on the left, possible values of the demand response event signal payload and, on the right, corresponding values of the power target appropriate for the user's facility. During operation, power manager 14 determines or selects a power target based on the payload. For example, power manager 14 uses the payload value, e.g., 0, 1, 2 or 3 in the example shown in FIG. 4A, as input into look-up table 52, obtains an output in the form of a power target, e.g., 40 kW, 35 kW, 25 kW or 10 kW in the example shown in FIG. 4A.

FIG. 4B illustrates a non-limiting example of a plot 54 of a payload value as an abscissa, e.g., electricity price, against power target as an ordinate. The scheme of FIG. 4B employs a function or curve 56, f(x) relating the demand response event signal payload value with the power target (PTAR) value which may be linear, piecewise linear, quadratic, etc. This is used for demand response event signals that include continuous values such as OpenADR signals of the Electricity_Price or Energy_Price types. The user inputs the equation for curve 56 of the form "y=f(x)", which is stored in power manager 14. During operation, power manager 14 takes the demand response event signal payload value as an "x" value and generates a "y" value that corresponds to the desired power target. The equation may also be piecewise, having different "f(x)" expressions for different ranges of the "x" variable, or may be linear, quadratic, polynomial or any appropriate function or group of piecewise functions. During operation, power manager 14 determines or selects a power target based on the payload. For example, with piecewise equations, power manager 14 would then determine which "f(x)" expression is appropriate for the current value of "x" (i.e., the payload value) and then evaluate that "f(x)" expression to find the corresponding "y" value, which is the power target (PTAR) for the given payload "x" value.

The scheme of FIG. 4C, passes the demand response event signal payload through directly or with some gain to achieve a power target (PTAR). This may be used for demand response event signals which already specify a power limit or are directly related to the power limit, such as most of the OpenADR Load_Dispatch type and the Load_Control type with the x-LoadControlCapacity subtype. The user specifies the value of the gain, which may be 1 or any other suitable value, depending upon the expected payload value, to convert the demand response event signal payload input to the appropriate range of power target values. During operation, power manager 14 determines or selects a power target based on the payload. For example, power manager 14 applies the gain to the demand response event signal payload to determine the power target (PTAR).

The payload-to-power target conversion schemes of FIGS. 4A-4C allow, in some embodiments, power manager 14 to automatically determine and change the power target in response to an external signal, i.e., without human intervention, an improvement over conventional power management schemes. This also provides a set of processes by which the new power target can be selected in a fashion that is appropriate for the type of demand response event signal which is received by power manager 14, and enables the user or facility manager to configure power manager 14 in an appropriate way based on the type of demand response program in which they are enrolled and that best fits their own power management requirements. The power target based on the payload may be implemented at the demand response event begin time, and at the demand response end time, the power target may be changed back to the original power target prior to the demand response event begin time, or may change to a scheduled power target based, e.g., on the time of day.

In some embodiments, an improvement is provided over conventional power management schemes by implementing load control as a power target rather than being performed by changing the setpoints of loads directly (e.g. thermostat setpoints, lighting dimness or brightness setpoints), e.g., based on the demand response event signal received at interface 28. This gives enhanced functionality to power manager 14, such as enabling the possibility that none of the loads change their status if the power consumption is already below the desired target. In conjunction with the power manager 14 action priority list 48, these schemes help ensure that the load shedding actions match the priorities of the facility manager and building 12 occupants.

In some embodiments, BAS interface 30 provides for communication between power manager 14 and BAS 16 for sending a load control signal from power manager 14 to BAS 16, wherein the load control signal is based on the power target that is itself based on the demand response event signal payload. In some embodiments, power manager 14 may employ a bit string, e.g., stored in a ModBus register, to indicate which load(s), e.g., which of variable and fixed loads 18, should be shed. The bit string has a series of bits which indicate whether the associated loads should be shed or not. In other embodiments, other storage means may be employed in place of ModBus registers. Each bit in the bit string corresponds to an entry or a line item in action priority list 48. For example, the first bit corresponds to the first priority load, the second bit to the second priority load, etc. In one form, if the bit is 0, the load is not to be shed, whereas if the bit is 1, the load is to be shed. In some embodiments, a 0 bit indicates that the load is at a normal, non-shed condition, or for variable loads, that the load should be in the condition it was in prior to the most recent shedding of that load. For example, if a thermostat is normally set at 24° C. during warm weather, and due to a demand response event is currently set at 30° C., but prior to the most recent shedding was set at 26° C. due to a previous, less severe demand response event, a 0 bit would signify changing the thermostat setpoint back to 26° C. A subsequent 0 bit in a following restoration action applied to this thermostat controlled load would signify a change back to 24° C. In other embodiments, 0 may indicate that the load is to be shed, whereas 1 may indicate that the load is not to be shed. The bit string is provided to BAS 16 and to the circuit breakers for the fixed electrical loads for modulating and turning on or off the variable and fixed electrical loads 18, respectively. In some embodiments, the ModBus or other bit string register is made available to a network, e.g., via a BAS gateway. In some embodiments that employ a ModBus register, BAS 16 also has access to this network and is able to read the ModBus register using an appropriate ModBus protocol. In other embodiments, other protocols may be employed to provide the bit string from power manager 14 to BAS 16 for the variable electrical loads, and in some embodiments for the fixed electrical loads, and/or circuit breakers for the fixed electrical loads.

Once BAS 16 has read the bit string, e.g., from the ModBus register, bit masks stored in BAS 16 and/or BAS server 22 are used to determine whether the loads controlled by BAS 16 have been commanded to shed (or restore). These bit masks are programmed by the user based on the action priority list and, e.g., the format of the ModBus register. If the BAS load is to be the third line item or third priority load to be shed, for instance, then the bit mask is set to find the status (e.g., 0 or 1) of the third bit of the bit string, e.g., the third bit in the register. Multiple masks are employed for multiple loads controlled by power manager 14. There is one bit mask for each variable load controlled by BAS 16, and for each circuit breaker for each corresponding fixed load, e.g., controlled by BAS 16.

Figure 5:
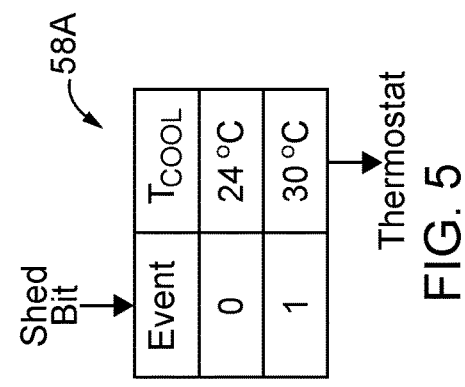
FIG. 5 illustrates some aspects of a non-limiting example of a translation lookup table in accordance with an embodiment of the present invention.

The output of the bit mask produces a binary control signal in the form of a bit with a value of 0 or 1. BAS 16 and/or BAS 22 stores a plurality of lookup tables 58 (FIG. 1), e.g., referred to as translation lookup tables, one lookup table for each variable load. BAS 16 generates commands to control the electrical loads based on the output of the translation lookup tables. The binary control signal, which is a load control signal, is input into the translation lookup table for the particular load. Each translation lookup table is constructed to translate a binary control signal into a command output of the BAS for controlling the BAS-controlled electrical loads. Each translation lookup table has two values: for an input of 0, it sets the output to the normal value of the targeted controller (or a previous value prior to a previous shedding, as indicated by way of example above, depending upon, e.g., the line items associated with each load, and rank of the prioritized loads). For an input of 1, it sets the output to a command having a value of the controller with lower energy consumption. For instance, FIG. 5 illustrates a non-limiting example of a translation lookup table 58A that might be used to control a thermostat for setting a room or area temperature. The thermostat is set to a cooling temperature of 24° C. during normal operation, but is increased to 30° C. when a load shedding is called for. If a bit value of 1 is received at BAS 16 from power manager 14, this will cause the HVAC system to stop attempting to cool this room as the temperature in the room cannot be higher than 24° C., resulting in a reduction in HVAC power consumption. The HVAC will remain off until the temperature in the room rises to 30° C., accruing further energy savings. Even once the HVAC turns back on, the energy consumption will be reduced since the warmer room loses less energy to the warm outside air and hence requires less energy from the HVAC to regulate the temperature.

It is to be noted that multiple similar building systems can be controlled with a single translation lookup table. The cooling setpoint, for instance, can be sent as a command to as many thermostats in cooling mode as exist within the building or to some subset thereof. A different translation lookup table is required for different types of load or different setpoints of the same types of loads. A thermostat in heating mode, for instance, would require a shed control value that is lower than the normal value to reduce energy consumption, and should therefore be controlled with a separate translation lookup table. A light with a dimmer function would take a dimming value between 0 and 1, and so should not receive a temperature setpoint at all. However, each type of load may be controlled with a single lookup table and hence ModBus register bit, in some embodiments.

Alternatively, the same type of load may be split into sub-groups in order to control the building with more precision. For example, a hallway or breakroom may receive a shed signal before a working area, for instance, and would therefore be controlled by a different register bit and lookup table so that it could be shed as a lower priority action. This also enables different zones to have different shedding values, such as causing a room which is usually unoccupied to increase temperature all the way to 30° C. while limiting working spaces to a temperature limit of 26° C. to preserve the health and safety of the occupants.

In some embodiments, BAS 16 and/or BAS server 22 have mechanisms to modify load controller setpoints automatically. For instance, a schedule may have been set which increases the thermostat cooling setpoint and dims the lights to 50% between the hours of 11:00 P.M. and 5:00 A.M. In the event that a single device has conflicting setpoints, the BAS 16 may be set up to use the setpoint of the mechanism which has changed most recently. For instance, if the schedule sets the lights to 50% dimming at 11:00 P.M., but a power manager 14 control action sets the lights to 80% dimming at 11:01 P.M., then the lights will stay at 80% until either the power manager changes the light settings again or the schedule restores the lights to 100% at 5:00 A.M. Some aspects of the present disclosure are built on this method of scheduling conflict resolution.

The user or facility manager will typically ensure that the BAS 16 control mechanisms and power manager 14 interact in a way that produces desired behavior. For instance, power manager 14 or interface 28 can be set to reject demand response signals between 10:00 P.M. and 6:00 A.M. This would set the power target to its highest value, likely resulting in all loads being restored since the building load is light at 10:00 P.M. Then, once the scheduler starts at 11:00 P.M. the building load will decrease even further, resulting in no further changes from power manager 14 until the reception of demand response event signals is re-enabled at 6:00 A.M. If BAS 16 uses a different conflict resolution method, the user or facility manager may take other steps to ensure that power manager 14 is set up to be compatible with this conflict resolution method.

This "latest change" conflict resolution method is employed in some embodiments of the present invention. Based on this conflict resolution method some aspects enable the facility manager to make multiple changes to the same power manager 14 and BAS 16 controlled variable or fixed electrical load 16. For example, a low priority action might be to dim the lights to 80%. A higher priority action might be to set the lights to 60% if the power manager 14 control input signal bit is 1 for the particular variable load 18 (e.g., a dimmable lighting load) and 80% if the control input signal bit is 0. Since only the most recent change is used, e.g., in some embodiments, the lights start at 100% even though the higher priority action has a control input of 0 and would indicate a dimming level of 80%. However, that action has not changed recently, so its output is not sent to the loads. The first shedding action would cause the first dimming action to go from 0 to 1, a change that triggers a dimming to 80%, e.g., using one translation table 58. Later, if the power is still above the target, another shedding action might cause the second dimming action to change from 0 to 1, a change which triggers a dimming to 60%, e.g., using a second translation lookup table 58. The first dimming action is still at 1, but the more recent change overrides the older change. Once the power drops below the power target, the control input changes from 1 to 0 and the second dimming action is restored. This causes the dimming to change from 60% to the value of 80%, e.g., indicated by the second translation lookup table 58 for dimming action #2 at control input of 0. Finally, with the power dropping still further, the control input of the first dimming action might change from 1 to 0, e.g., using the first translation lookup table 58, triggering a change from 80% dimming to 100% light output.

Figures 6, 7:
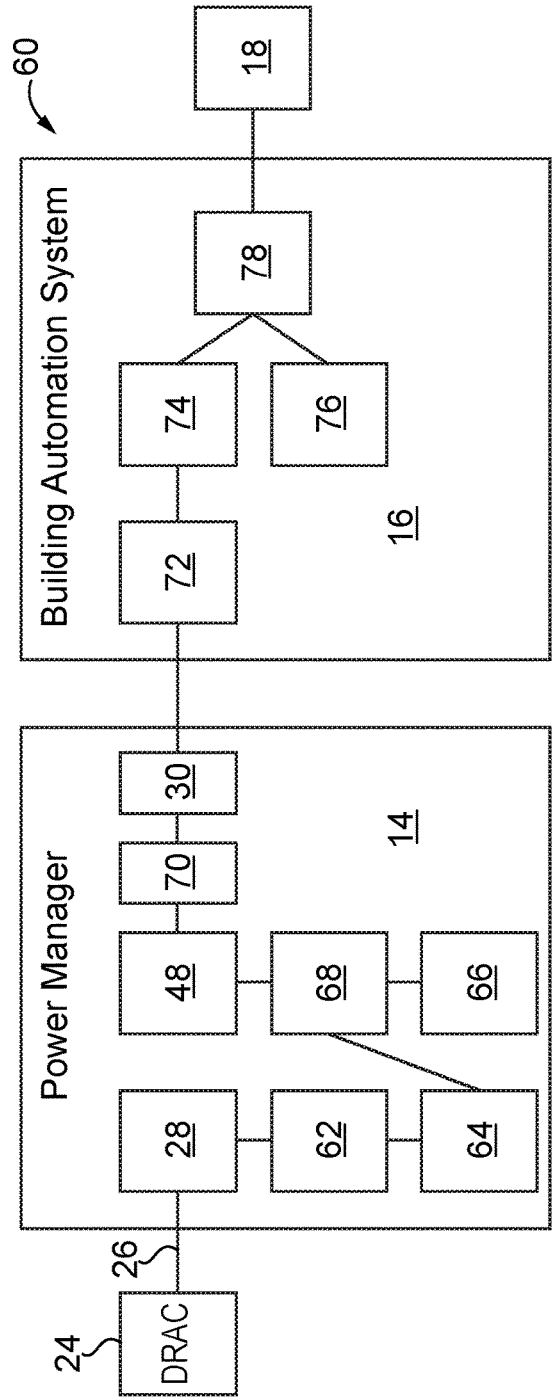
FIG. 6 illustrates some aspects of a non-limiting example of an action priority list in accordance with an embodiment of the present invention.
FIG. 7 schematically illustrates some aspects of a non-limiting example of a system for performing power management for a building in accordance with an embodiment of the present invention.

Referring to FIG. 6, some aspects of a non-limiting example of an action priority list 48B in accordance with an embodiment of the present invention is illustrated. Action priority list 48B is stored in a memory accessible to power manager 14. Action priority list 48B includes as line items BAS controlled variable electrical loads, in addition to line items representing fixed loads controlled by circuit breakers (CB). In various embodiments, the fixed loads may be controlled by power manager 14 directly or via BAS 16. In the scenario of FIG. 6, four new control actions are added, which are not in action priority list 48A (FIG. 3). Instead of disconnecting the optional load first (priority 8 in FIG. 6), the lights are dimmed in an attempt to preserve access to, for example, the coffee machines or other fixed loads which may make up the Optional Load. In the current state the circuit breaker to the optional loads has been turned off, hence the "Y" in the "Taken" column.

If the average power projection is still higher than the power target, then another shedding action is indicated. Power manager 14 starts from the bottom of the action priority list and works upwards in order to shed loads, i.e., to look for the lowest priority load that has not been shed yet, which can thus be shed in response to the average power being higher than the power target (and outside of the tolerance bandwidth). When average power is below the power target and outside of the tolerance bandwidth, power manager 14 works from the top of the action priority list and works downward to restore loads, i.e., to look for the highest priority load that was previously shed and can be restored. Regarding the example of FIG. 6, if load shedding is required to bring the average power to within the tolerance bandwidth of the power target, power manager 14 works upward from the bottom, and finds that the lowest priority unshed load is the thermostat control for the break room. Power manager 14 then changes the value of the ModBus register to indicate that this load should be shed, e.g., by changing the bit in the bit string to 1, and the BAS reads this change over the network. A bit mask is applied to the ModBus register value to discover that the change applies to the break room thermostat. A plurality of bit masks are employed by BAS 16 against the bit string or load control signal, at least one bit mask for each line item in action priority list 48, each bit mask of which generates a binary control signal. This binary input or binary control signal is fed into a translation lookup table for each load, e.g., the break room thermostat, where a change from 0 to 1 prompts a change in the thermostat setpoint from 24° C. to 30° C. Once this occurs, the action priority list is updated to replace "N" with "Y" in the "Taken" column, to indicate that the action of shedding the load has been taken. Although the break room might become slightly less comfortable, the work areas, where the occupants spend most of their time, remains comfortable. This ensures that the building reduces its energy consumption with minimal discomfort for the building occupants.

If the scenario were such that the action priority list 48 had the same state as shown in FIG. 6, but a restoration action was called for (e.g., because the power target had increased, or overall power consumption had reduced), power manager 14 would start at the top of the list and work its way down. It would find that the highest priority load that has already been shed is the optional load (CB controlled optional load, priority 8), so it would change the ModBus register to indicate that the optional load should be restored. In some embodiments, this would be read by another portion of power manager 14, and an analog load control signal would be generated and sent to the circuit breaker feeding power to the optional load (e.g., such as circuit breaker (CB) 18D or 18E or other circuit breaker associated with the optional load), causing it to close. This would restore power to the optional load and move the power average up toward the power target. In other embodiments, power manager 14 would change the bit associated with the priority 8 optional load in the bit string to 0, and send the bit string to BAS 16, which would direct the circuit breaker to close.

BAS interface 30 provides an improvement over conventional power management systems. BAS interface 30 improves the functionality of power manager 14 by making its shed/restore signal (load control signal) available on a network, e.g., via a BAS gateway. BAS interface 30 and BAS 16 provide a method and the translation look up table 58 to interpret that signal in a way that it can be acted upon by BAS 16 and BAS server 22. Translation look up table 58 relates the values of each bit in the load control bit string, or each binary control signal obtained from the bit masks as applied to the load control bit string, to commands that are to be issued by BAS 16 to loads based on the load control signals, in order to control such loads. BAS interface 30 provides BAS 16 and BAS server 22 access to power manager 14 load shedding and restoration functions, action priority list 48, and demand response interface 28.

Some embodiments of the present invention provide a method for implementing demand response load control combining both circuit breaker controls and BAS controlled loads. For example, one of many possible embodiments for implementing some of aspects of the present invention described herein is set forth in the schematic depiction of FIG. 7, which illustrates some aspects of a non-limiting example of system 60 for performing power management for building 12 and/or other facilities. In one form, system 60 is a more detailed non-limiting example of some aspects of system 10, and may be employed to implement the methodology described in the present disclosure. System 60 includes power manager 14 and BAS 16. Power manager 14 is communicatively coupled to DRAC 24 via internet 26, e.g., a secure hypertext transfer protocol (HTTPS) connection. In other embodiments, other forms of communication links may be employed. BAS 16 is communicatively coupled to power manager 14 and to a plurality of electrical loads 18 that are controlled by BAS 18, e.g., variable electrical loads, and in some embodiments, fixed electrical loads, e.g., circuit breaker controlled fixed electrical loads.

Power manager 14 is operative to set power targets based on demand response event signals received from DRAC 24, and to determine which loads are to be shed or restored based on the power targets. Power manager 14 includes interface 28; a parser 62, a power target selector 64; a power signal input 66; an average power comparator 68; action priority list 48; a load shed/restore register 70, and BAS interface 30. BAS 16 includes a plurality of bit masks 72, e.g., one bit mask for each line item (priority load(s)) in action list 48; a gateway 74 for interfacing with a network; a scheduler 76, e.g., a load shed and restore scheduler for shedding and restoring loads based on time of day and/or day of week and/or day of year; and a latest command register 78 for storing the latest shed/restore control signals or commands. Power manager 14 and BAS 16 are jointly operative to set power targets and shed and restore loads based on the power targets. The restore actions may take place, for example, in response to receipt of a newer and higher power target, or in response to reaching the end of the time or period for the demand response event.

Interface 28 is operative to interface power manager 14 with DRAC 24 for receiving demand response event signals from DRAC 24. Parser 62 is communicatively coupled to interface 28. Parser 62 is operative to receive the demand response event signal from interface 28, and to parse the demand response event signal, e.g., to parse or extract the payload and begin and end times for the demand response event. The type of parser 62 may vary with the need of the application. For example, if the demand response event signal is in the form of an XML file, parser 62 may be an XML parser. Other embodiments may employ other types of parsers.

Power target selector 64 is operative to select the power target based on the parsed demand response event signal. For example, assuming a current nominal power target, power target selector 64 is operative to select a new power target based on a new demand response event signal, wherein the new power target is parsed payload received from parser 62. The new power target is implemented at the demand response event begin time specified in the demand response event signal and parsed by parser 62. At the demand response end time specified in the demand response event signal and parsed by parser 62, power target selector 64 selects a subsequent power target, e.g., wherein the subsequent power target is a reversion to the original nominal power target before implementation of the demand response event power target, or another power target, e.g., a scheduled power target.

Power signal input 66 supplies power manager 14 with the measured power consumption 40 of building(s) 12 and/or other facilities. Average power comparator 68 determines the average power over a predetermined time or time window based on power input from power signal input 66, and compares the average power consumption with the power target determined by power target selector 64. If the average power consumption is above the power target (above the power target tolerance bandwidth), loads are selected for shedding, based on action priority list 48. If the average power consumption is below the power target (below the power target tolerance bandwidth), loads are selected for being restored, based on action priority list 48.

If the average power consumption is within the tolerance bandwidth for the power target, loads are neither shed nor restored. Where loads are to be shed or restored, a bit string is generated, wherein each bit in the bit string corresponds to a line item (priority load(s)) in action priority list 48, and stored in a load shed/restore register 70, e.g., a ModBus or other form of register, and transmitted from power manager 14 to BAS 16 using interface 30.

The bit string supplied to BAS 16 is applied against each of the bit masks in plurality of bit masks 72, one bit mask for each line item in action priority list 48, and each resulting output bit or binary control signal is input to the translation lookup table 58 for each load that is controlled by BAS 16 and the load status bit for each load is supplied gateway 74. A load command, i.e., the command for each load based on the output of the translation lookup tables 58 and based on the power target, is supplied to latest command register. The scheduled load commands are also supplied to latest command register 78 from load scheduler 76, e.g., time schedule based loads. The latter command, i.e., the command that is later in time, of the power target-based load command and the schedule-based load command, is stored in the latest command register, and transmitted to each of the loads 18 that are controlled by BAS 16. Latest command register 78 stores the latest command for each load, and updates only when a new command from gateway 74 or scheduler 76 is received.

Embodiments of the present invention include a method for performing building power management for a building, comprising: interfacing a power manager with an upstream controller using an upstream controller interface, wherein the upstream controller is constructed to provide a demand response event signal having a payload, a demand response event begin time and a demand response event end time; receiving the demand response event signal at the power manager; parsing the demand response event signal; determining a power target based on the payload, the demand response begin time and the demand response end time; establishing a power target tolerance bandwidth disposed about the power target; evaluating whether an average power consumption over a predetermined time period falls within, exceeds or falls below the power target tolerance bandwidth; determining whether a shed action or a restore action is required for the average power consumption to meet and fall within the power target tolerance bandwidth, based on the evaluating; determining which variable electrical loads and which fixed electrical loads of a plurality of variable electrical loads and fixed electrical loads are to be shed or restored based on an action priority list, responsive to determining whether the shed action or the restore action is required; interfacing the power manager with a building automation system (BAS) using a BAS interface; providing a load control signal from the power manager to the BAS, via the BAS interface, instructing that selected variable and fixed electrical loads of the plurality of variable electrical loads and fixed electrical loads are to be shed or restored, based on the action priority list; and selectively maintaining, shedding or restoring the selected variable and fixed electrical loads responsive to the load control signal to control the power consumption of the building to fall within the power target tolerance bandwidth.

In a refinement, the method further comprises applying, using the BAS, a plurality of bitmasks to the load control signal, each bitmask corresponding to an electrical load of the plurality of variable electrical loads and fixed electrical loads; generating a binary control signal for each variable electrical load of the plurality of variable electrical loads and fixed electrical loads based on an output of the corresponding bitmask; and controlling the variable electrical loads with the BAS using the binary control signal by changing a setpoint of the variable electrical load.

In another refinement, the method further comprises generating the binary control signal for each fixed electrical load of the plurality of variable electrical loads and fixed electrical loads based on the output of the corresponding bitmask; and controlling each fixed electrical load with the BAS using the binary control signal.

In yet another refinement, the method further comprises applying the binary control signal to a translation lookup table in the BAS to determine a command for each electrical load controlled by the BAS, wherein the command is based on the action priority list, the load control signal, the bitmask and the binary control signals; and sending, using the BAS, the command to each electrical load controlled by the BAS.

In still another refinement, the method further comprises polling the upstream controller for the demand response event signal.

In yet still another refinement, the load control signal is operative to provide instructions to maintain, shed or restore each electrical load of the plurality of variable electrical loads and fixed electrical loads.

In a further refinement, the method further comprises obtaining the demand response event signal and controlling the plurality of variable electrical loads and fixed electrical loads based on the demand response event signal without human intervention.

In a yet further refinement, the method further comprises providing the load control signal as a bit string having a plurality of bits, each bit corresponding to one of the variable electrical loads and the fixed electrical loads of the plurality of variable electrical loads and fixed electrical loads.

In a still further refinement, the method further comprises determining another power target after the demand response end time, and controlling the variable electrical loads and the fixed electrical loads based on the other power target.

In a yet still further refinement, the method further comprises restoring shed loads responsive to reaching the demand response event end time.

Embodiments of the present invention include a system for performing building power management for a building in response to a demand response event signal generated by an upstream demand response controller, the demand response signal including a payload, a demand response event begin time and a demand response event end time, comprising: a building automation system (BAS) constructed to send a plurality of commands to a plurality of electrical loads to control a power consumption of the plurality of electrical loads; a power manager having a BAS interface and a demand response controller interface, wherein the BAS interface is constructed to interface the power manager with the BAS; wherein the demand response controller interface is constructed to interface the power manager with the upstream demand response controller via a communication link and operative to receive the demand response event signal from the upstream demand response controller; wherein the power manager is constructed to: parse the demand response event signal; determine a power target based on the payload, the demand response event begin time and the demand response event end time; establish a power target tolerance bandwidth disposed about the power target; evaluate whether an average power consumption over a predetermined time period falls within, exceeds or falls below the power target tolerance bandwidth; access an action priority list that is constructed to prioritize the plurality of electrical loads; determine whether a shed action or a restore action is required, based on the evaluation and on the action priority list; determine which electrical loads of the plurality of electrical loads are to be shed or restored responsive to determining whether the shed action or the restore action is required; and providing a load control signal to the BAS, via the BAS interface, instructing the BAS that selected electrical loads of the plurality of electrical loads are to be shed or restored; and wherein the BAS is constructed to send at least some commands of the plurality of commands to selectively maintain, shed or restore the selected electrical loads responsive to the load control signal to control the power consumption of the building to fall within the power target tolerance bandwidth.

In a refinement, the plurality of electrical loads includes a plurality of variable electrical loads controlled by the BAS and at least one fixed electrical load; wherein the power manager is constructed to directly control the at least one fixed electrical load.

In another refinement, the plurality of electrical loads includes a plurality of variable electrical loads controlled by the BAS and at least one fixed electrical load controlled by the BAS.

In yet another refinement, the plurality of electrical loads includes a plurality of variable electrical loads controlled by the BAS; wherein the BAS stores a plurality of bitmasks, each bitmask corresponding to a variable electrical load of the plurality of variable electrical loads; and wherein the BAS is constructed to apply the bitmask of the plurality of bitmasks to the load control signal for each corresponding variable electrical load; generate a binary control signal for each corresponding variable electrical load based on an output of the bitmask; and send at least one command of the plurality of commands to selected variable loads of the plurality of variable electrical loads to control the selected variable electrical loads with the BAS using the binary control signal to change a setpoint of selected variable electrical load.

In still another refinement, the BAS is constructed to generate at least one of the binary control signals for the at least one fixed electrical load and control the at least one fixed electrical load using the at least one of the binary control signals.

In yet still another refinement, for each electrical load of a plurality of electrical loads controlled by the BAS, the BAS stores a plurality of bitmasks, each bitmask corresponding to an electrical load of the plurality of electrical loads; wherein the BAS is constructed to apply the bitmask of the plurality of bitmasks to the load control signal for each electrical load controlled by the BAS; and generate a binary control signal for each corresponding electrical load based on an output of the bitmask; wherein the BAS accesses and/or stores a plurality of translation lookup tables corresponding to the plurality of electrical loads controlled by the BAS; and wherein the BAS is constructed to apply the binary control signal to a translation lookup of the plurality of translation lookup tables in the BAS to determine at least a command of the plurality of commands for each electrical load of the plurality of electrical loads controlled by the BAS, the at least a command being based on the action priority list, the load control signal, the bitmask and the binary control signal; and sending the at least a command to each corresponding electrical load controlled by the BAS.

In a further refinement, the power manager is constructed to poll the upstream demand response controller for a demand response event signal.

In a yet further refinement, the power manager and the BAS are constructed to obtain the demand response control signal and control the plurality of electrical loads electrical loads based on the demand response event signal without human intervention.

In a still further refinement, the power manager is constructed to provide the load control signal in the form of a bit string having a plurality of bits, each bit corresponding to an electrical load of the plurality of electrical loads.

Embodiments of the present invention include a system for performing building power management in response to a demand response event signal generated by an upstream demand response controller, comprising: an interface constructed to receive the demand response event signal from the upstream demand response controller for controlling a plurality of electrical loads, the plurality of electrical loads including variable electrical loads and fixed electrical loads; means for generating a load control signal instructing that selected electrical loads of the plurality of electrical loads are to be shed or restored, based on a power consumption falling within, exceeding or falling below power target tolerance bandwidth, and based on an action priority list constructed to prioritize the plurality of electrical loads, the action priority list being accessible by the means for generating the load control signal; and means for generating commands to selectively maintain, shed or restore each electrical load of the plurality of electrical loads based on the load control signal.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for performing building power management for a building, comprising:
   interfacing a power manager with an upstream controller using an upstream controller interface, wherein the upstream controller is constructed to provide a demand response event signal having a payload, a demand response event begin time and a demand response event end time;
   receiving the demand response event signal at the power manager;
   parsing the demand response event signal;
   determining a power target based on the payload, the demand response begin time and the demand response end time;
   establishing a power target tolerance bandwidth disposed about the power target;
   evaluating whether an average power consumption over a predetermined time period falls within, exceeds or falls below the power target tolerance bandwidth;
   determining whether a shed action or a restore action is required for the average power consumption to meet and fall within the power target tolerance bandwidth, based on the evaluating;
   determining which variable electrical loads and which fixed electrical loads of a plurality of variable electrical loads and fixed electrical loads are to be shed or restored based on an action priority list, responsive to determining whether the shed action or the restore action is required;
   interfacing the power manager with a building automation system (BAS) using a BAS interface;
   providing a load control signal from the power manager to the BAS, via the BAS interface, instructing that selected variable and fixed electrical loads of the plurality of variable electrical loads and fixed electrical loads are to be shed or restored, based on the action priority list; and
   selectively maintaining, shedding or restoring the selected variable and fixed electrical loads responsive to the load control signal to control the power consumption of the building to fall within the power target tolerance bandwidth.

2. The method of claim 1, further comprising:
   applying, using the BAS, a plurality of bitmasks to the load control signal, each bitmask corresponding to an electrical load of the plurality of variable electrical loads and fixed electrical loads;
   generating a binary control signal for each variable electrical load of the plurality of variable electrical loads and fixed electrical loads based on an output of the corresponding bitmask; and
   controlling the variable electrical loads with the BAS using the binary control signal by changing a setpoint of the variable electrical load.

3. The method of claim 2, further comprising:
   generating the binary control signal for each fixed electrical load of the plurality of variable electrical loads and fixed electrical loads based on the output of the corresponding bitmask; and
   controlling each fixed electrical load with the BAS using the binary control signal.

4. The method of claim 2, further comprising:
   applying the binary control signal to a translation lookup table in the BAS to determine a command for each electrical load controlled by the BAS, wherein the command is based on the action priority list, the load control signal, the bitmask and the binary control signals; and
   sending, using the BAS, the command to each electrical load controlled by the BAS.

5. The method of claim 1, further comprising polling the upstream controller for the demand response event signal.

6. The method of claim 1, wherein the load control signal is operative to provide instructions to maintain, shed or restore each electrical load of the plurality of variable electrical loads and fixed electrical loads.

7. The method of claim 1, further comprising obtaining the demand response event signal and controlling the plurality of variable electrical loads and fixed electrical loads based on the demand response event signal without human intervention.

8. The method of claim 1, further comprising providing the load control signal as a bit string having a plurality of bits, each bit corresponding to one of the variable electrical loads and the fixed electrical loads of the plurality of variable electrical loads and fixed electrical loads.

9. The method of claim 1, further comprising determining another power target after the demand response end time, and controlling the variable electrical loads and the fixed electrical loads based on the other power target.

10. The method of claim 1, further comprising restoring shed loads responsive to reaching the demand response event end time.

11. The method of claim 1, wherein the action priority list includes a plurality of different loads, each different load having a different priority in the action priority list.

12. The method of claim 1, wherein the action priority list includes a plurality of different setpoints for a same load, each different setpoint having a different priority in the action priority list.

13. A system for performing building power management for a building in response to a demand response event signal generated by an upstream demand response controller, the demand response signal including a payload, a demand response event begin time and a demand response event end time, comprising:
  a building automation system (BAS) constructed to send a plurality of commands to a plurality of electrical loads to control a power consumption of the plurality of electrical loads;
  a power manager having a BAS interface and a demand response controller interface, wherein the BAS interface is constructed to interface the power manager with the BAS; wherein the demand response controller interface is constructed to interface the power manager with the upstream demand response controller via a communication link and operative to receive the demand response event signal from the upstream demand response controller;
  wherein the power manager is constructed to: parse the demand response event signal; determine a power target based on the payload, the demand response event begin time and the demand response event end time; establish a power target tolerance bandwidth disposed about the power target; evaluate whether an average power consumption over a predetermined time period falls within, exceeds or falls below the power target tolerance bandwidth; access an action priority list that is constructed to prioritize the plurality of electrical loads; determine whether a shed action or a restore action is required, based on the evaluation and on the action priority list; determine which electrical loads of the plurality of electrical loads are to be shed or restored responsive to determining whether the shed action or the restore action is required; and providing a load control signal to the BAS, via the BAS interface, instructing the BAS that selected electrical loads of the plurality of electrical loads are to be shed or restored; and
  wherein the BAS is constructed to send at least some commands of the plurality of commands to selectively maintain, shed or restore the selected electrical loads responsive to the load control signal to control the power consumption of the building to fall within the power target tolerance bandwidth.

14. The system of claim 13, wherein the plurality of electrical loads includes a plurality of variable electrical loads controlled by the BAS and at least one fixed electrical load; and wherein the power manager is constructed to directly control the at least one fixed electrical load.

15. The system of claim 13, wherein the plurality of electrical loads includes a plurality of variable electrical loads controlled by the BAS and at least one fixed electrical load controlled by the BAS.

16. The system of claim 13, wherein the plurality of electrical loads includes a plurality of variable electrical loads controlled by the BAS; wherein the BAS stores a plurality of bitmasks, each bitmask corresponding to a variable electrical load of the plurality of variable electrical loads; and wherein the BAS is constructed to apply the bitmask of the plurality of bitmasks to the load control signal for each corresponding variable electrical load; generate a binary control signal for each corresponding variable electrical load based on an output of the bitmask; and send at least one command of the plurality of commands to selected variable loads of the plurality of variable electrical loads to control the selected variable electrical loads with the BAS using the binary control signal to change a setpoint of selected variable electrical load.

17. The system of claim 16, wherein the BAS is constructed to generate at least one of the binary control signals for the at least one fixed electrical load and control the at least one fixed electrical load using the at least one of the binary control signals.

18. The system of claim 13, wherein, for each electrical load of a plurality of electrical loads controlled by the BAS, the BAS stores a plurality of bitmasks, each bitmask corresponding to an electrical load of the plurality of electrical loads; wherein the BAS is constructed to apply the bitmask of the plurality of bitmasks to the load control signal for each electrical load controlled by the BAS; and generate a binary control signal for each corresponding electrical load based on an output of the bitmask; wherein the BAS accesses and/or stores a plurality of translation lookup tables corresponding to the plurality of electrical loads controlled by the BAS; and wherein the BAS is constructed to apply the binary control signal to a translation lookup of the plurality of translation lookup tables in the BAS to determine at least a command of the plurality of commands for each electrical load of the plurality of electrical loads controlled by the BAS, the at least a command being based on the action priority list, the load control signal, the bitmask and the binary control signal; and sending the at least a command to each corresponding electrical load controlled by the BAS.

19. The system of claim 13, wherein the power manager is constructed to poll the upstream demand response controller for a demand response event signal.

20. The system of claim 13, wherein the power manager and the BAS are constructed to obtain the demand response control signal and control the plurality of electrical loads electrical loads based on the demand response event signal without human intervention.

21. The system of claim 13, wherein the power manager is constructed to provide the load control signal in the form of a bit string having a plurality of bits, each bit corresponding to an electrical load of the plurality of electrical loads.

22. A system for performing building power management in response to a demand response event signal generated by an upstream demand response controller, comprising:
  an interface constructed to receive the demand response event signal from the upstream demand response controller for controlling a plurality of electrical loads, the plurality of electrical loads including variable electrical loads and fixed electrical loads;

means for generating a load control signal instructing that selected electrical loads of the plurality of electrical loads are to be shed or restored, based on a power consumption falling within, exceeding or falling below power target tolerance bandwidth, and based on an action priority list constructed to prioritize the plurality of electrical loads, the action priority list being accessible by the means for generating the load control signal; and means for generating commands to selectively maintain, shed or restore each electrical load of the plurality of electrical loads based on the load control signal.

* * * * *